Aug. 12, 1969  F. E. BUSCHBOM  3,460,688
SILO UNLOADER DRIVE

Filed Nov. 15, 1967  3 Sheets-Sheet 1

INVENTOR.
FLOYD E. BUSCHBOM

BY Burd, MacEachron, Braddock,
Bartz & Schwartz
ATTORNEYS

Aug. 12, 1969  F. E. BUSCHBOM  3,460,688
SILO UNLOADER DRIVE
Filed Nov. 15, 1967  3 Sheets-Sheet 2
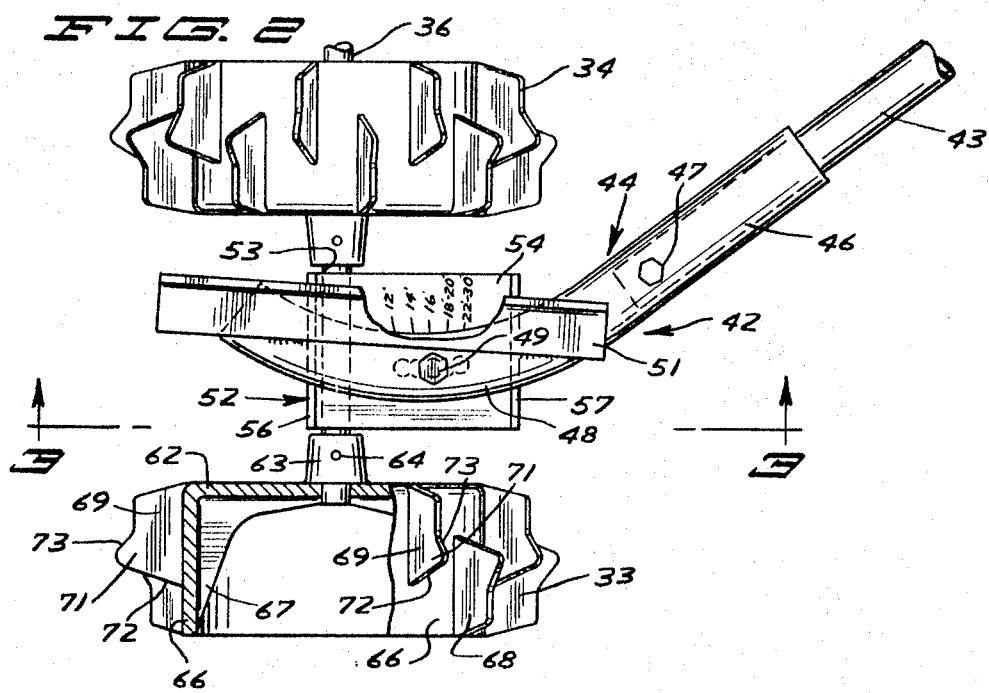
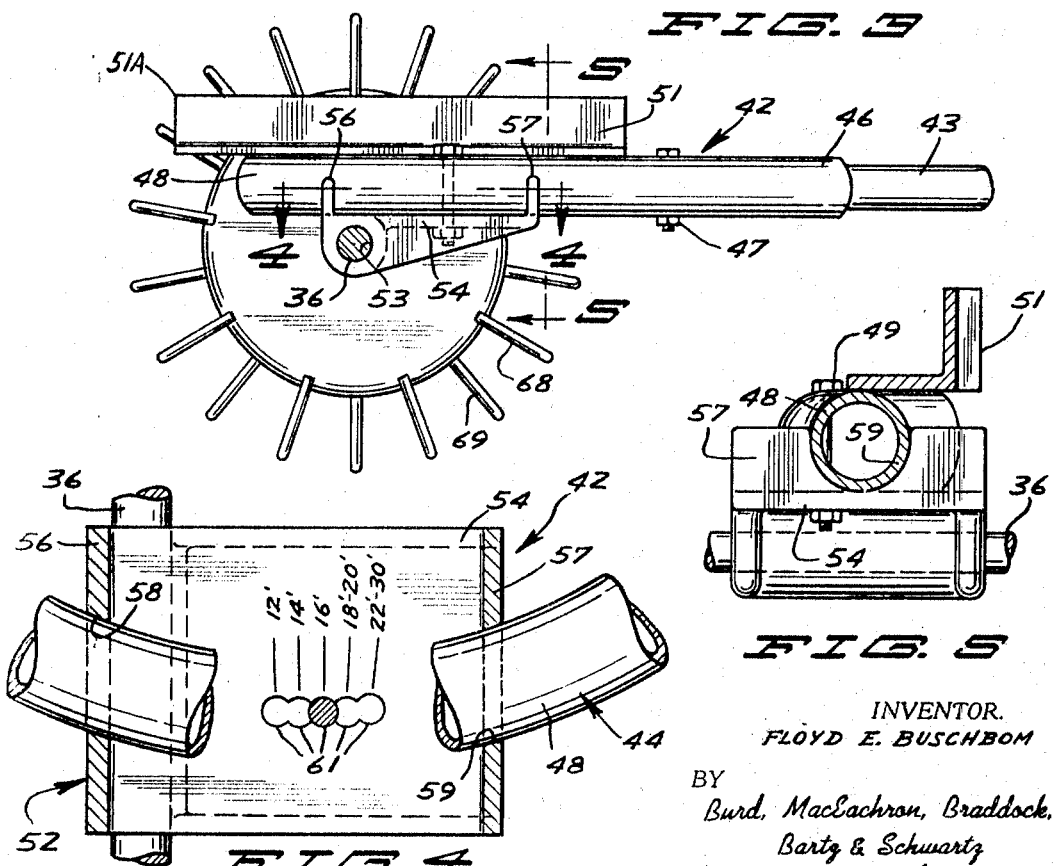
INVENTOR.
FLOYD E. BUSCHBOM
BY
Burd, MacEachron, Braddock,
Bartz & Schwartz
ATTORNEYS Aug. 12, 1969  F. E. BUSCHBOM  3,460,688
SILO UNLOADER DRIVE
Filed Nov. 15, 1967  3 Sheets-Sheet 3
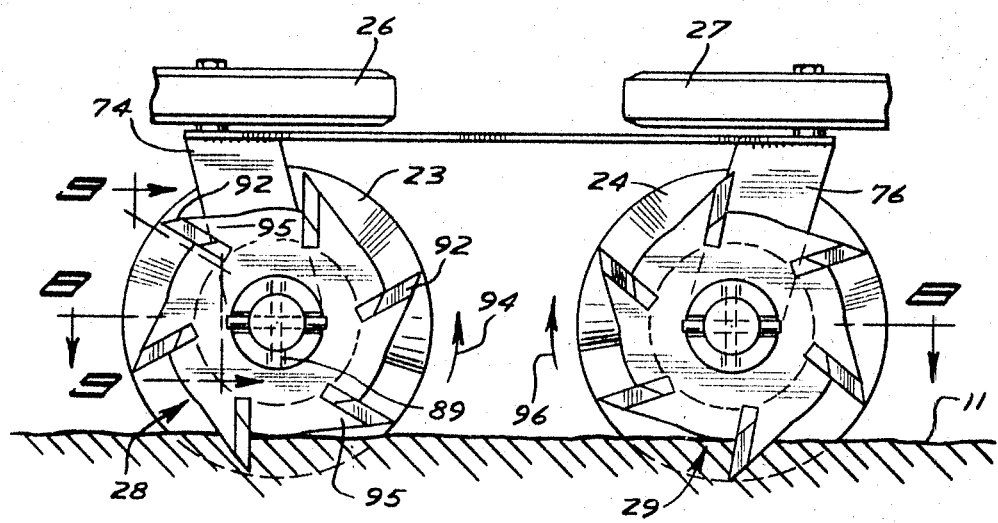
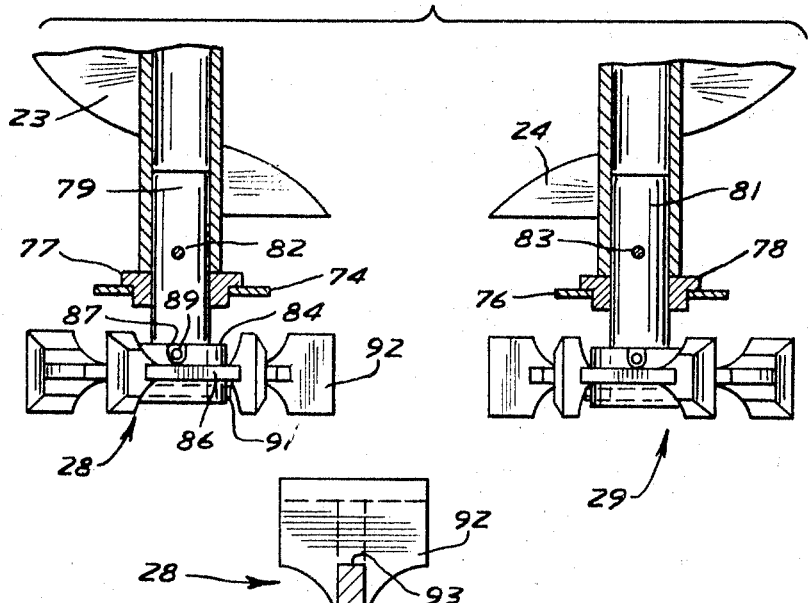
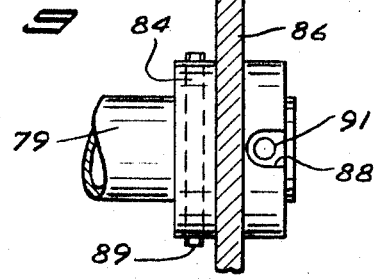
INVENTOR.
FLOYD E. BUSCHBOM
BY Burd, MacEachron, Braddock,
Bartz & Schwartz
ATTORNEYS

# United States Patent Office 3,460,688
Patented Aug. 12, 1969

3,460,688
SILO UNLOADER DRIVE
Floyd E. Buschbom, Long Lake, Minn., assignor to Van Dale Corporation, Long Lake, Minn., a corporation of Minnesota
Filed Nov. 15, 1967, Ser. No. 683,273
Int. Cl. B65g 65/38, 33/14
U.S. Cl. 214—17                                      11 Claims

ABSTRACT OF THE DISCLOSURE

A top unloading silo unloader having a pair of drive hubs for moving a collector arm around the silo. A tie rod extended from the outer end of the collector arm is attached to the drive shaft between the drive hubs by a connector assembly having an arcuate arm cooperating with a guide having a pair of spaced grooves receiving the arm to hold the drive hubs in an adjusted angular position with reference to the collector arm. Each of the drive hubs has circumferentially spaced oppositely directed pairs of radial lugs. Removably and reversibly mounted on the outer ends of the collector arm augers are wall cleaners having forwardly projected teeth.

BACKGROUND OF INVENTION

Top unloading silo unloaders are equipped with drive wheels for moving the silage collector arm of the unloader around the silo. These wheels are located adjacent the rearward side, the forward side, or adjacent both sides of the collector arm and are driven from a power transmission operated with the silo unloader motor. The position of the drive wheels relative to the collector arm determines the force of the engagement of the collector arm wall engaging wheels with the silo wall as well as the force moving the collector arm around the silo. A sufficient force on the collector arm must be created with a minimum of side slip of the drive wheel to permit effective operation of the unloader. The drive hubs in U.S. Patents No. 3,139,995 and No. 3,169,798 for the top unloading silo unloaders are adjustable with reference to the unloader to minimize the side slip and vary the pressure between the collector arm wall engaging wheel.

Silo unloaders are also provided with wall cleaners having upwardly directed teeth mounted on the outer ends of the collector arm augers. Patents No. 2,888,253 and No. 3,138,268 show examples of this type of wall cleaners these wall cleaners are fixedly mounted on a short stub shaft connected to the ends of the collector arm augers. They are not removable or reversibly mounted to extend the effective life of the wall cleaner.

The silo unloader drive of the present invention overcomes the disadvantages of the prior silo unloader drives by providing self-cleaning drive wheels attached to an adjustable connector assembly used to change the angle of the drive hub wheels relative to the collector arm. The connector assembly enables the unloader to accommodate different sized silos and insures efficient wall pressure on the outboard wall engaging wheels. At the same time the drive wheels generate a force sufficient to drive the silo unloader collector arm around the silo. The collector arm has removable and reversible wall cleaners.

SUMMARY OF INVENTION

The invention relates to a silo unloader drive including self-cleaning drive hub wheels connected to an adjustable connector assembly used to attach the wheels to a tie rod leading from the collector arm of a silo unloader. The connector assembly has cooperating arcuate groove and arm means for adjusting the position of the drive hub wheels about a generally upright axis. The groove and arm means provide a positive guide whereby the drive hub wheels may be located in a position commensurate with the different size silos, yet at the same time, maintain a desirable pressure of the collector arm wall engaging wheels with the wall of the silo. The drive hub wheels are each provided with radially extended pairs of lugs which project axially in opposite directions from the center section of the hub providing a self-cleaning arrangement of lugs. Movably mounted on the outer ends of the augers of the collector arm are a pair of reversible wall cleaners having outwardly and forwardly projected teeth.

IN THE DRAWINGS

FIGURE 2 is an enlarged plan view partly sectional of the drive hubs and tie bar connector of FIGURE 1;

FIGURE 3 is an enlarged sectional view taken along the line 3—3 of FIGURE 2;

FIGURE 4 is an enlarged sectional view taken along the line 4—4 of FIGURE 3;

FIGURE 5 is a sectional view taken long the line 5—5 of FIGURE 3;

FIGURE 7 is an enlarged end view of the collector arm taken along the line 7—7 of FIGURE 6;

FIGURE 8 is a sectional view taken along the line 8—8 of FIGURE 7; and

FIGURE 9 is a sectional view taken along the line 9—9 of FIGURE 7.

Figure 1:
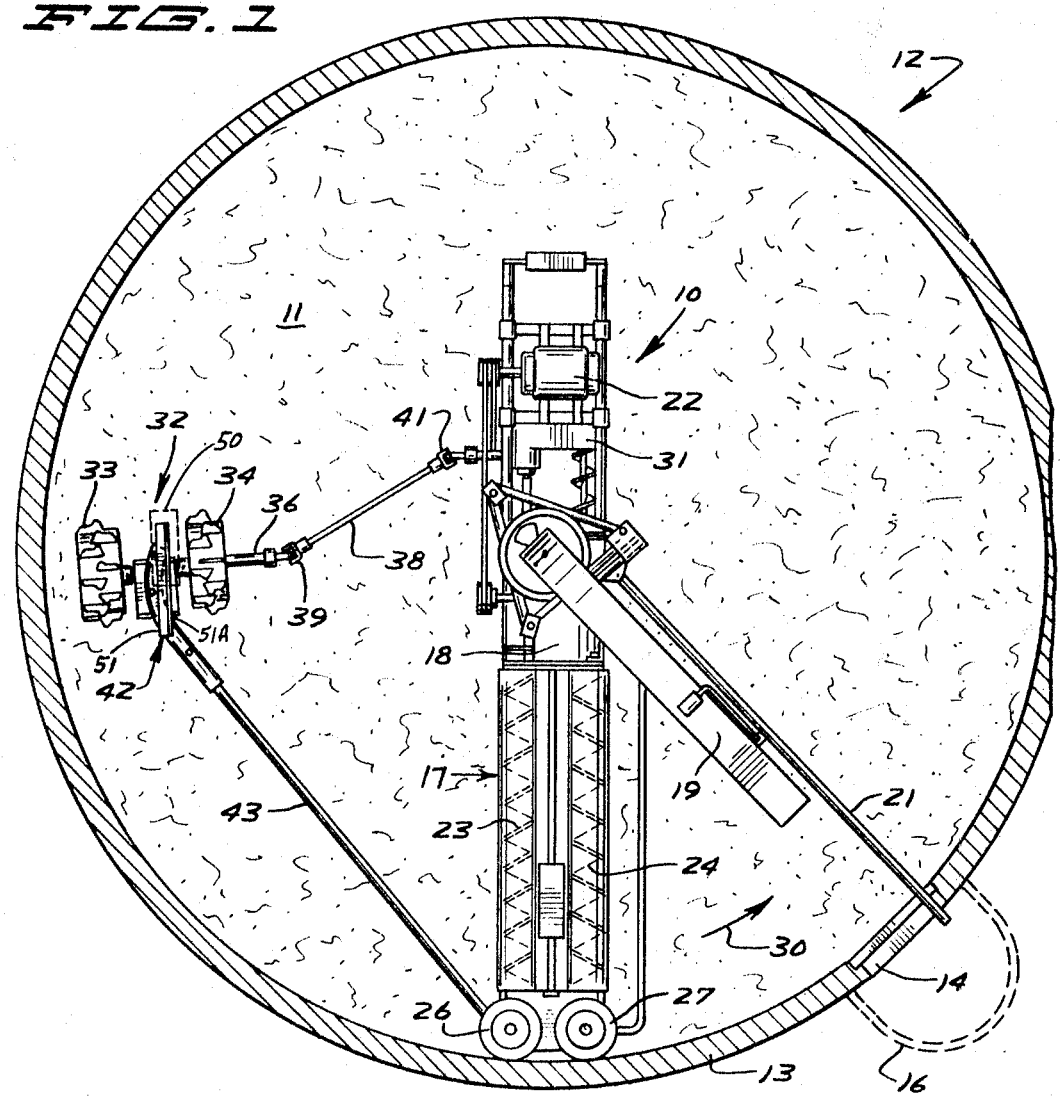
FIGURE 1 is a plan view of a silo unloader of the invention located in a tower silo shown in section.

Referring to the drawings, there is shown in FIGURE 1 a silo unloader indicated generally at 10 positioned on top of ensilage 11 stored in a tower silo 12. The silo unloader 10 continuously moves around silo wall 13 collecting ensilage and discharging the collected ensilage through the silo door 14 into the upright chute 16.

Figure 6:
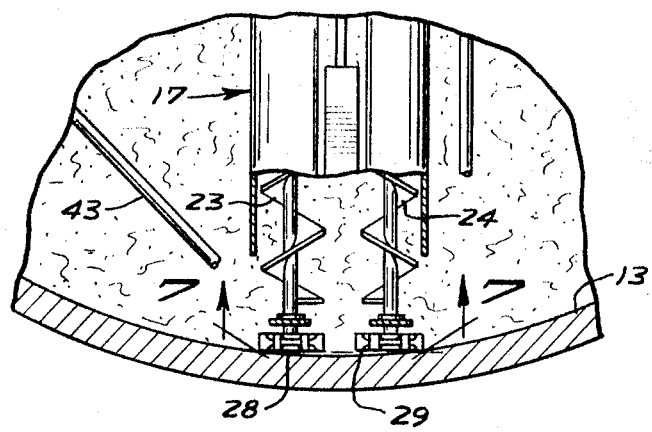
FIGURE 6 is a plan view of the outer end of the collector arm with parts broken away to show the wall cleaners.

Silo unloader 10 has an elongated collector arm 17 secured at its inner end to an impeller 18 for receiving the silage and discharging the ensilage into a discharge chute 19 operative to direct the ensilage through door 14. A torque arm 21 mounted to the center portion of the silo unloader extends through the door to maintain the chute 19 in alignment with the door. Silo unloader 10 has a motor 22 driving a transmission 31 used to turn a pair of augers 23 and 24. Rotatably mounted on the outer end of collector arm 17 are a pair of spaced horizontal wall engaging wheels 26 and 27 operative to space wall cleaners or chipper wheels 28 and 29, shown in FIGURE 6, a short distance from silo wall 13.

Transmission 31 is also used to transmit power to drive means indicated generally at 32. In use, drive means 32 angularly moves the collector arm 17 around the silo wall 13 in the direction of the arrow 30 and maintains the wheels 26 and 27 in engagement with the silo wall 13. Drive means 32 comprises a pair of hubs or wheels 33 and 34 mounted on a driven shaft 36. Shaft 36 is drivably connected with the transmission 31, with a shaft 38 and universal joints 39 and 41. On operation of motor 22, transmission 31 drives augers 23 and 24 in opposite directions and concurrently drives the wheels 33 and 34 moving collector arm 17 around the silo.

Located between the wheels 33 and 34 is a connector assembly indicated generally at 42 secured to a forwardly projected tie bar 43. The forward end of tie bar 43 is connected to the outer end of collector 17 to transmit the force of the drive means to the collector arm. As shown in FIGURE 2, connector assembly 42 comprises a curved arm 44 having a first straight end 46 telescoped into the end of tie bar 43 and secured thereto with a transverse bolt 47. Leading from the first end 46 is an opposite or second curved end 48 having a single upright hole accommodating a bolt 49. A brace 51 secured to the curved end 48 reinforces the arm 44. Located below arm 44 is a guide member indicated generally at 52 having a horizontal bore 53 for rotatably accommodating the shaft 36 whereby the guide member 52 functions as a bearing for shaft 36. Guide member 52 has a flat generally horizontal base 54 and upright front and rear flanges 56 and 57. As shown in FIGURE 4, flanges 56 and 57 have grooves or cutouts 58 and 59 along an arc which is complementary to the curvatures of the second end 48. FIGURE 5 shows the groove 59 as having a generally semi-circular shape. Groove 58 is similar to the groove 59. Grooves 58 and 59 serve as guides for the curved end 48 and direct the rotation of the guide member 52 and shaft 36 carrying wheels 33 and 34 about an upright axis. The bolt 49 projects through one of a plurality of adjacent holes 61 in the mid-portion of the base 54 to secure the arm 44 to the base. Holes 61 are in a side-by-side relationship along the arc corresponding to the arcuate curvature of the end 48. Base 54 carries indicia 12, 14, 16, 18–20, and 22–30 for selected holes to indicate the position of bolt 49 for different diameter silos. On the assembly of the silo unloader in the silo, bolt 49 merely need be inserted in the proper size hole 61 according to the dimension of the silo. Additional adjustments are not necessary as the angular relationship of the axis of rotation of the drive hubs 33 and 34 relative to the collector arm of the silo unloader has been predetermined with the diameters of the various size silos. In the smaller diameter silos, the axis of rotation of the hubs 33 and 34 approaches a normal position relative to the collector arm 17. Conversely as the diameter of the silo increases, the axis of rotation of the drive wheels 33 and 34 moves toward the collector arm 17 and forms an acute angle with the radial extent of the collector arm.

Brace 51 is an elongated angle member having a mount shown as an upright flange or rib 51A, extended between wheels 33 and 34. As shown in broken lines in FIGURE 1, a weight 50 is removably mounted on rib 51A to increase the traction of wheels 33 and 34. Weight 50 is similar to the counter weight on collector arm 17 shown in detail in U.S. Patent No. 3,232,456. Weight 50 has an elongated groove or slot (not shown) for receiving the rib 51A and a set screw (not shown) for securing the weight to the rib. This makes the weight readily removable and available for use on the collector arm 17 or inner end of the silo unloader frame. The rib 51A is also used as a place to store weights not used on other elements of the unloader.

Returning to FIGURE 2, wheels 33 and 34 are axially spaced from each other on the driven shaft 36 with the connector assembly 42 located between the wheels. Wheels 33 and 34 are identical in the structure and operate as a pair to drive the collector arm 17 around the silo. The following description is limited to the wheel 33.

Wheel 33 is a cast metal integral member comprising a base or disc 62 carrying an outwardly directed center boss 63 having a bore for receiving the shaft 36. A transverse pin or fastener 64 drivably connects the boss to the shaft 36. Extended axially from the periphery of disc 62 is an axial flange 66 reinforced with the disc by a plurality of circumferentially spaced and inwardly directed ribs 67. Integral with the outer face of the flange 66 are a plurality of circumferentially spaced pairs of lugs 68 and 69. The lugs extend in radial directions with each pair of lugs extended in opposite axial directions. The inner ends of each lug extend across the mid-section of the flange 66 and have outwardly directed triangular extensions 71. The apex of each triangular extension 71 lies along the transverse mid-plane of the flange 66. The inside edges 72 of the lugs extend downwardly to the flange 66 and has a greater incline than the outer edges 73 which join with the axial top edges of the lugs. The oppositely directed relationship of the pairs of lugs as well as the difference in the slopes of the adjacent edges of the pairs of lugs provides the drive wheels with effective traction as well as self-cleaning characteristics.

Referring to FIGURES 7 and 8, wall cleaners 28 and 29 located below the wall engaging wheels 26 and 27 are secured to the outer ends of the augers 23 and 24 respectively. The silo unloader frame has downwardly projected legs 74 and 76 carrying bearings 77 and 78. Short shafts 79 and 81 rotatably mounted on the bearings 77 and 78 are attached to the augers by pins 82 and 83 respectively. The shafts 79 and 81 project outwardly through the bearings and carry the wall cleaners 28 and 29 respectively. The following description is limited to wall cleaner 28 which is identical with wall cleaner 29.

Wall cleaner 28 has a central cylindrical collar 84 carrying an annular radial disc 86. Opposite sides of collar 84 have diametrical recesses 87 and 88 normally disposed with respect to each other. Referring to FIGURES 8 and 9, pins 89 and 91 projected through transverse holes in the shaft 79 have opposite ends extended into the recesses 87 and 88 to fix wall cleaner on the shaft 79. Secured to the outer peripheral portion of disc 86 are a plurality of outwardly extended knives 92. Each wall cleaner has six equally spaced forwardly inclined knives. The number of knives may vary with the shape of the disc 86. Each knife lies along a cord of the disc 86 and slopes outwardly and forwardly about 20 degrees from a radial line passing through the base of the knife. The knife has a U-shaped recess 93 in the inner or base end of the knife receiving a peripheral portion of the disc. The disc 86 has outward projected extensions 95 behind each knife to reinforce and hold the knives in their forwardly inclined positions. Referring to FIGURE 9, knife 92 has a generally rectangular shape and a width substantially greater than the thickness of disc 86. The opposite sides of the knife 92 are equally spaced from the disc 86 and have linen cutting edges joined with an outer axial cutting edge.

As shown in FIGURE 7, the augers and wall cleaners 28 and 29 rotate in opposite directions as indicated by the arrows 94 and 96. The outer ends of the forwardly extended knives 92 as well as the sides of the knives function as cutting edges acting on the ensilage adjacent the silo wall. After considerable use, it is desirable to reverse the wall cleaners. This may be done by removing the outer pin 91 in each of the wall cleaners and exchanging the wall cleaner 28 for the wall cleaner 29. The reversed wall cleaners are secured to the shafts by replacing the pins 91. This reverses the cutting edges of both of the wall cleaners thereby extending the useful life of the wall cleaners.

It is apparent that many modifications and variations of the features of the silo unloader described and shown may be made by those skilled in the art without departing from the spirit and scope of the invention. The specific embodiments described are given by way of example only.

The embodiments of the invention in which an exclusive property or privilege is claimed are defined as follows:

1. In a silo unloader the improvement of: a shaft, hub means secured to such shaft for rotation therewith, tie bar means connected to said shaft and extended therefrom to said unloader for positioning said hub means, and connector means coupling the tie bar means to the shaft, said connector means comprising a first means mounted on the shaft, second means secured to the tie bar means, said first and second means having cooperating arcuate groove and arm means for adjusting the position of the shaft about an upright axis, and means for securing the first means to the second means thereby holding the shaft in an adjusted position.

2. The silo unloader of claim 1 wherein said hub means comprises a pair of spaced drive wheels, said connector means being located between the wheels, said first means having a pair of spaced grooves and said second means having an arcuate arm cooperating with the pair of spaced grooves to adjust the position of the shaft about an upright axis.

3. The silo unloader of claim 2 wherein said first means includes a series of holes for selectively accommodating the means for securing the first means to the second means whereby the shaft may be adjusted to a predetermined position.

4. The silo unloader of claim 3 wherein said holes are located between the pair of spaced grooves.

5. The silo unloader of claim 1 including means to drive the shaft, said hub means comprising a pair of spaced drive wheels, said connector means being located between the wheels, said tie bar means extended from said driven shaft and connected to the outer end of a silo unloader collector arm, said first means having a bearing for receiving the driven shaft, a base and spaced upright flanges, each flange having an arcuate groove, said second means having an arcuate arm cooperating with the grooves to adjust the position of the driven shaft about an upright axis, said base having a series of holes for selectively accommodating the means for securing the first means to the second means whereby the driven shaft may be held in a selected adjusted position.

6. The silo unloader of claim 1 wherein the hub means includes a wheel having an annular peripheral flange, a plurality of pairs of oppositely directed circumferentially spaced lugs projected radially from said flange, each of said lugs having a length less than the length of the flange and an outwardly directed triangular shaped inner end.

7. The silo unloader of claim 6 wherein the triangular shaped inner end of each lug has an apex located generally along a plane passing through the transverse mid-portion of the flange.

8. The silo unloader structure of claim 1 wherein: said hub means comprise a pair of spaced drive wheels, said connector means located between said drive wheels, a mount secured to the connector means and weight means carried on said mount.

9. The silo unloader structure of claim 8 wherein: the mount is an elongated upright rib extended generally transverse to the shaft carrying the hub means.

10. The silo unloader structure of claim 1 including: a mount secured to the connector means, and weight means carried on said mount.

11. The silo unloader structure of claim 10 wherein: the mount is an elongated upright rib extended generally transverse to the shaft carrying the hub means, said weight being adjustably positioned on said rib.

References Cited
UNITED STATES PATENTS

| | | | |
|---|---|---|---|
| 485,865 | 11/1892 | Hadley | 287—14 |
| 3,139,995 | 7/1964 | Buschbom | 214—17 |
| 3,161,304 | 12/1964 | Smith | 214—17 |
| 3,266,643 | 8/1966 | Prentice | 214—17 |

ROBERT G. SHERIDAN, Primary Examiner